Figure 1:
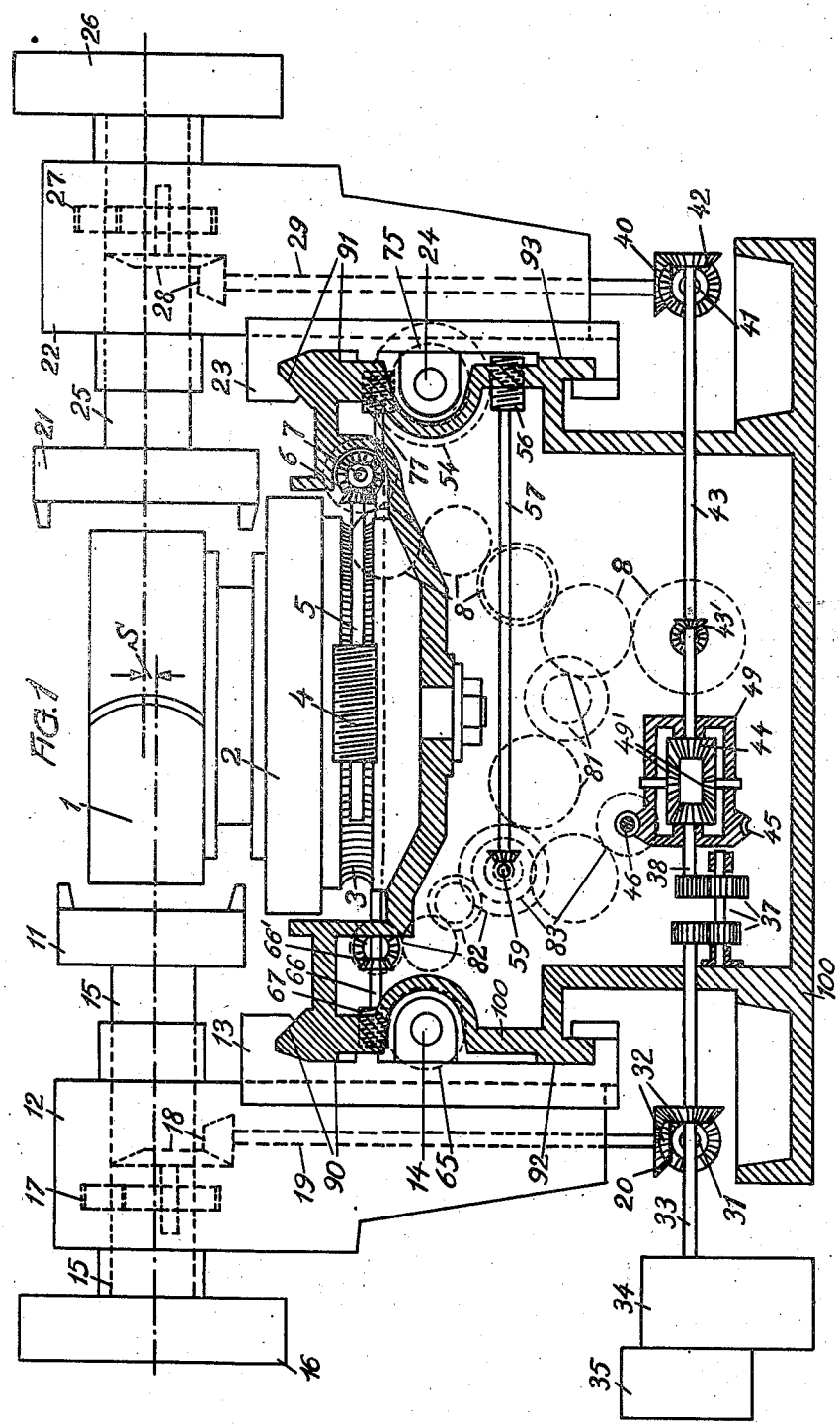

Aug. 20, 1946.   A. FORSTER   2,406,009
MACHINE FOR CUTTING CURVED SELFCONJUGATE INDENTATIONS
Filed Aug. 23, 1940   3 Sheets-Sheet 1

Inventor:
Albert Forster
By William C. Linton, Atty.

Aug. 20, 1946.  A. FORSTER  2,406,009
MACHINE FOR CUTTING CURVED SELFCONJUGATE INDENTATIONS
Filed Aug. 23, 1940  3 Sheets-Sheet 2

FIG.2

Inventor:
Albert Forster
By William C. Linton.
Atty.

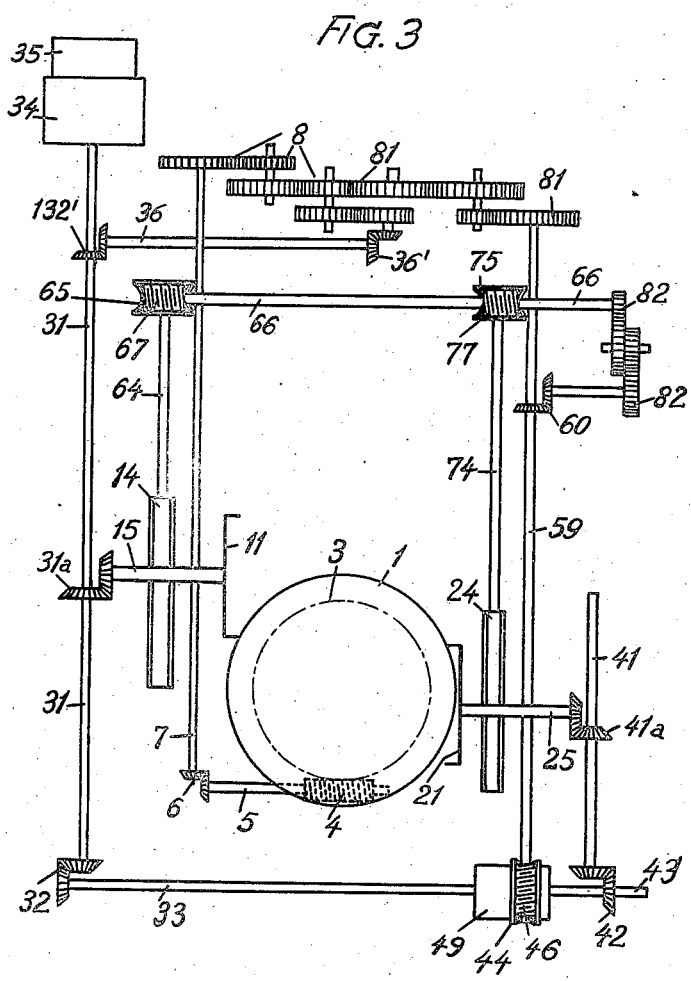

Patented Aug. 20, 1946

2,406,009

UNITED STATES PATENT OFFICE 2,406,009

MACHINE FOR CUTTING CURVED, SELF-CONJUGATE INDENTATIONS

Albert Forster, Milanino, Italy, assignor to Buhler Brothers, Uzwil, Switzerland, a corporation of Switzerland Application August 23, 1940, Serial No. 353,966
In Switzerland August 24, 1939

16 Claims. (Cl. 90—5)

The present invention relates to a machine for cutting curved, selfconjugate indentations by continuous rolling. Hereinafter there will be called "selfconjugate" such identations which are able to mesh with congruous identations and the teeth will be called "curved" when their axes, lying on the pitch surface, have a longitudinal curvature. In an indentation one will consider the number of teeth $z$ and the pitch $t$ and with regard to the milling heads cutting the concave or convex faces of teeth one considers the speeds of rotation $f$ and $g$ of the cutting motions as well as the speeds of translation $v$ and $w$ of the feeding motions. A feeding motion will be regarded as positive (negative) when it has a positive (negative) moment about the axis of the blank.

Methods and machines for cutting these kind of indentations are known and use at least two milling heads rotating about their own axis (cutting movement) and at the same time translating at right angles to their own axis and to that of the blank (feeding movement), whilst the blank also rotates about its own axis, as well for effecting the rolling as for generating the longitudinal curvature of teeth. For practically obtaining various cutting and feeding speeds of the milling heads gearings are commonly used, whose toothed gears have numbers of teeth such that the required ratios of transmission are obtained.

Ratios between the speeds of rotation and of translation of the milling heads are known, being such that the speeds of rotation of the milling heads cutting the concave and convex tooth faces are different from one another and their speeds of translation may also be uneven.

With known methods and machines, having so defined cutting and feeding speeds selfconjugated indentations cannot be cut in perfectly correct manner, since the curvatures of the concave and convex tooth faces do thereby not in all cases result exactly equal, so that the indentations do not perfectly mesh with each other.

The object of the invention is a machine for cutting such indentations, with which in any case exactly equal profiles and longitudinal curvatures are obtained and therefore selfconjugate indentations meshing with each other with absolute perfection may be cut.

In carrying out the invention, the ratio between the speeds of rotation of the milling heads is made $$\frac{f}{g} = \frac{tz+v}{tz+w}$$

and the axes of rotation of the milling heads are displaced with regard to one another by a given distance in the direction of the axis of rotation of the blank. The speeds of translation $v$ and $w$ may have any value, but the quickest cutting of an indentation is obtained, under same circumstances, when $v$ and $w$ are equally great, but have the opposite sign ($w=-v$). The ratio between the speeds of rotation of the milling heads is, in this case:

$$\frac{f}{g} = \frac{tz+v}{tz-v} = \frac{tz-w}{tz+w}$$

This ratio results generally out of one or more rather great prime numbers, so that for carrying it out in practice one must use gear wheels with many hundreds of teeth. The gearings carrying out these ratios must however also permit the variation of the ratio itself, i. e. they must be provided with change wheels, in order to cut on the machine indentations with various numbers of teeth.

In addition thereto these gearings must, especially for the transmission of the cutting motion to the milling heads, transfer the whole cutting energy, so that the change wheels must have a corresponding great modulus. Many teeth and a great modulus require however great dimensions of the change wheels and of the change speed gear.

The machine for carrying out the method according to the invention overcomes these difficulties by using a planetary gear connecting the shafts which impress the cutting or feeding motion to the milling heads cutting the concave and to those cutting the convex faces of teeth and adapted to superimpose to the driving motion with relatively great speed of rotation and working energy a subsidiary controlling motion with relatively small speed of rotation and correspondingly low controlling energy. The controlling motion may be picked up from a change speed gear of the machine or from a link of the mechanism transmitting the motion to a feeding screw. The planetary gear may be preceded by a worm gear and a part of the change speed gear may be built itself as a planetary gear. According to an embodiment of the invention the planetary gear may be inserted between the feeding screws and a gearing having one or more fixed transmission ratios may be provided between the shafts of the milling heads. According to another embodiment, which may use equally great feeds for both milling heads, the planetary gear may be inserted between the shafts of the milling heads. The source of energy may be applied so that the planetary gear lies within the flow of energy either to a feeding screw or to a milling shaft only, or at the same time also within the flow of energy to the blank. The controlling motion for the planetary gear may also be picked up either before or after the same with regard to the flow of energy. For setting the distance by which the axes of rotation of the milling heads are displaced with regard to one another in the direction of the blank axis, parallel to the blank axis, slidable carriages for the milling heads may be provided.

The appended drawings are diagrammatical views of a machine for carrying out the method according to the invention shown in some embodiments given merely as examples, and precisely:

The Figure 1 is a sectional elevation of a first embodiment;

The Figure 2 is a plan view of a second embodiment;

The Figure 3 is a plan view of a third embodiment.

Many other embodiments are however possible within the invention.

Referring to the figures, the blank 1 is fixed on a rotatable, horizontal work table 2, carrying an index worm wheel 3, which is driven by a worm 4 receiving the motion through shaft 5, bevels 6 and shaft 7 from the change speed gear 8 of the machine. The milling heads 11, 21 are journalled on vertically slidable carriages 12, 22 and these carriages are carried by slides 13, 23 which may slide horizontally along guide ways 90, 92 and 91, 93 fixed on the main frame 100 of the machine. The slides 13, 23 are longitudinally driven by feeding screws 14, 24 for effecting the feeding motion of the milling heads. These feeding screws are driven by shafts 64, 74, worm wheels 65, 75, worms 67, 77 and shaft 66 from the change speed gear 82 of the machine. The change speed gear 82 receives motion from a shaft 59 driven by the change speed gear 81 of the machine. The milling heads 11, 21 are keyed on rotatable shafts 15, 25 which carry flywheels 16, 26 in order to avoid vibrations and are driven from the transmission shafts 31, 41 which are connected with the main change speed gear 34, driven by the source of energy 35 through bevel gears 32, 42 and shafts 33, 43. The change speed gears 8 and 81 are also in driving relation with the same source of energy 35.

According to Figure 1 the change speed gears 8 and 81 are connected through bevels 43' with the shaft 43. The shaft 66 is driven from the change speed gear 82 through a bevel gear 66'. The shafts 15, 25 of the milling heads are connected with the transmission shafts 31, 41 through spur gears 17, 27, bevel gears 18, 28, vertical shafts 19, 29 and bevel gears 20, 40. The main change speed gear 34 drives shaft 33.

The shafts 15, 25 of the milling heads 11, 21 are displaced with regard to one another by the distance S in the direction of the axis of rotation of the blank 1. This distance is defined as the distance of the planes parallel to the work table 2 and passing through the axes of the shafts 15 and 25 of the milling heads. The distance S is a function of the width and of the modulus of the indentation to be cut and of the radius of the milling heads, measured at the cutting edges of the cutters and it is independent from the number of teeth. The distance S remains thus invariated when cutting a wheel and successively cutting the corresponding pinion, so that errors of position of the axes of the milling heads are avoided and perfect relationship of the curvatures of teeth is assured. The amount of this distance S may however be chosen at will, without preventing the machine from cutting correct selfconjugate gears.

The toothed gears carrying out the ratio according to the invention between the speeds of rotation of the milling heads are provided at two places: between shafts 33 and 43 there are the spur wheel gear 37 with one fixed ratio and the planetary gear 44, which is connected with the foregoing through a shaft 38 and receives the controlling motion from the shaft 59 through change speed gear 83 and worm gear 46, 45; before the feeding screw 24 there is the planetary gear 54, which receives the controlling motion, through the control worm 56 and the shaft 57, also from the shaft 59.

With this machine, in order to obtain the correct ratio $$\frac{f}{g} = \frac{tz+v}{tz+w}$$

according to the invention between the speeds of rotation of the milling heads and their speeds of translation, either the gearing 37 with fixed ratio or the planetary gears 44 and 54 may be conveniently chosen, whilst a variation of this ratio is obtained by means of the control change speed gear 83, which has to deal only with the small control energy and therefore may have small overall dimensions and little weight. This machine may therefore cut any type of indentations, as well those for which $w=-v$ (in which case the feeding screws 14 and 24 have equal great speeds of rotation and the control worm 56 remains fixed), as those for which $w$ and $v$ are in any other ratio to one another.

According to this embodiment the fixed gear 37 and the planetary gear 44 are situated in the transmission of motion between the external source of energy 35 and the blank 1, the shaft 25 and both feeding screws 14, 24 as well as the derivation of the control motion for both planetary gears 44 and 54, whilst the planetary gear 54 is situated outwards of the transmission of motion from the same source of energy 35 to the blank and the shafts of the milling heads. The flow of energy to the blank, the shaft 25 and the screw 14 passes therefore through the gear 44, but not through the gear 54.

The source of energy 35 could however also be located at any other site, e. g. at the shaft 29 or 57, and the gearings 37 and 44 would then no more be within the flow of energy to the blank, the shaft 25 and the feeding screws, but only within that to the shaft 15. Further, instead of, or in addition to, a change speed gear 83, for the transmission of the control motion to the planetary gear 44 or 54, another planetary gear could also be used.

According to Figure 2, the machine is provided with three milling heads 11, 21, 121. The milling head 121 assists the milling head 21 in cutting the convex faces of teeth on the blank 1 and permits a greater production to be obtained from the machine, without touching anything at the milling head 11. The milling head 121 is journalled similarly to both other milling heads on a vertically displaceable carriage 122, which may be displaced along the guide way 191 by means of a slide 123 and a feeding screw 124, which is moved by the screw 24 through a bevel gear 184. The milling head 121 is keyed on a rotatable shaft 125 provided with a flywheel 126 and driven from the transmission shaft 141, which is connected with the shaft 43 through a bevel gear 142. The milling head 121 has a speed of rotation and a speed of translation as great as those of the milling head 21; the direction of these speeds is however different, since the milling head 121 has another angular position about the blank. The milling head 121 is displaced, equally as the milling head 21, with regard to the milling head 11, by the above defined distance S in the direction of the blank axis.

In this machine the main change speed gear 34 drives directly the shaft 43 and the shaft 31, which is connected with the foregoing one, drives through a bevel gear 132 the shaft 36, which is connected through bevels 36' with the change speed gears 8 and 81. The change speed gear 82 is connected with the shaft 66 through bevels 66'. The milling heads 15, 25, 125 are connected through spur gears 17, 27, 127, bevel gears 18, 28, 128, vertical shafts 19, 29, 129 and bevel gears 20, 40, 140 with the transmission shafts 31, 41, 141.

For setting the correct transmission ratio between the speeds of rotation and of translation of the milling heads cutting the concave and those cutting the convex faces of teeth, a change speed gear 37a with training wheels 10 giving two fixed ratios is provided between the shafts 33 and 43, and a planetary gear 54 is provided before the feeding shaft 74 and controlled, through a worm gear 55, 56, shaft 57 and bevel gear 58, from the shaft 59.

According to this embodiment the planetary gear 54 is out of the flow of energy from the external source of energy to the blank and the shafts of the milling heads. The gearing 37a is on the contrary within the flow of energy as well to the blank and the feeding screws as to the shaft 15. It is understood that the milling head 11 also could be doubled, or any milling head could be assisted by two or more others.

According to Figure 3 the main change speed gear 34 drives the shaft 31, which in turn drives through bevels 132', shaft 36 and bevels 36' the change speed gears 8 and 81. Between shaft 59 and change speed gear 82 bevel wheels 60 are provided. The shafts 15, 25 are driven by shafts 31, 41 by means of bevel gears 31a, 41a.

According to this embodiment only two milling heads are provided, which have equally great, but contrary feeding speeds. The feeding screws are therefore driven with equally great speeds of revolution. The planetary gear 44 serving for carrying out the ratio according to the invention between the speeds of rotation of the milling heads is inserted between the shafts 33 and 43 and is controlled by shaft 59 through worm 46 acting upon its casing 49, which is formed as a worm wheel.

On this machine the axes of the milling heads are parallel to one another and the carriages thereof could therefore be fixed on the main frame of the machine, whilst the feed would be effected by the blank. The feeds of both milling heads have indeed the same direction in the space and the same value, so that the carriages are immovable to one another and move themselves only with regard to the blank.

On this embodiment the planetary gear is out of the flow of energy from the source of energy 35 to the blank 1, to the shaft 15, to the feeding screws and to the derivation of the controlling motion for the planetary gear itself. The source of energy could however also be located at any other place, e. g. on the shaft 41, so that the planetary gear would be within the flow of energy to all the above named points of utilisation.

In the various embodiments of the machine according to the invention the planetary gears and the change gears with fixed transmission ratios may be as well made with bevel as with hypoid or spur toothed wheels, or with chain or worm gears, etc. and they may have any transmission ratio. The change speed and other gearings may be made and disposed in any manner other than shown and described. The planetary gears may be inserted either in the transmission of the cutting motion (rotation) or in that of the feeding motion (translation) to one or more milling heads; a planetary gear may be inserted also in the transmission of the rotating or translating movement to the blank and used as well alone as in addition to another transmission gear of known construction. The milling heads may be used in any quantity and rotate either in the same or in opposite senses and they may have any angular position about the blank. Either a single or a plurality of, conveniently synchronised, sources of energy, either electric or pneumatic, hydraulic, thermic, or purely mechanic may be used for the various drives. Several other particulars may also be executed in various manners within the limits of the appended claims.

I claim:

1. A machine for cutting self-conjugated curved indentations by continuous rolling, comprising a work table, adapted to carry a blank and having an axis of rotation, a milling head, adapted to cut the concave faces of teeth, operatively connected with said work table, having an axis of rotation and effecting a cutting motion consisting of a rotation about the said own axis and a feeding motion consisting of a translation in a direction at right angles to the said axes of rotation of its own and of said work table, another milling head, adapted to cut the convex faces of teeth, having an axis of rotation and effecting a cutting motion consisting of a rotation about the said own axis and a feeding motion consisting of a translation in a direction at right angles to the said axes of rotation of its own and of said work table, means, operatively connecting the said milling heads and adapted to impress on said second mentioned milling head a driving motion of great speed and energy and a superimposed, variable, control motion of little speed and energy, carriages, slidable in a direction parallel to the said axis of rotation of the work table, adapted to carry the said milling heads and to displace same with regard to one another.

2. A machine for cutting self-conjugated curved indentations by continuous rolling, comprising a work table, adapted to carry a blank and having an axis of rotation, a milling head, adapted to cut the convex faces of teeth, operatively connected with said work table, having an axis of rotation and effecting a cutting motion consisting of a rotation about the said own axis and a feeding motion consisting of a translation in a direction at right angles to the said axes of rotation of its own and of said work table, another milling head, adapted to cut the concave faces of teeth, having an axis of rotation and effecting a cutting motion consisting of a rotation about the said own axis and a feeding motion consisting of a translation in a direction at right angles to the said axes of rotation of its own and of said work table, means, operatively connecting the said milling heads and adapted to impress on said second mentioned milling head a driving motion of great speed and energy and a superimposed, variable, control motion of little speed and energy, carriages, slidable in a direction parallel to the said axis of rotation of the work table, adapted to carry the said milling heads and to displace same with regard to one another.

3. A machine for cutting self-conjugated curved indentations by continuous rolling, comprising a work table, adapted to carry a blank and having an axis of rotation, a milling head, adapted to cut the concave faces of teeth, being operatively connected with said work table, having an axis of rotation and effecting a cutting motion consisting of a rotation about the said own axis and a feeding motion consisting of a translation in a direction at right angles to the said axes of rotation of its own and of said work table, another milling head, adapted to cut the convex faces of teeth, having an axis of rotation and effecting a cutting motion consisting of a rotation about the said own axis and a feeding motion consisting of a translation in a direction at right angles to the said axes of rotation of its own and of said work table, a planetary gear, operatively connected to said milling heads and adapted to impress on said second mentioned milling head a feeding motion consisting of a driving motion of great speed and energy and a superimposed, variable, control motion of little speed and energy, a gearing with a fixed transmission ratio, operatively connecting the said milling heads and adapted to impress on said second mentioned milling head a cutting motion consisting of a rotation at a speed being in a given ratio to the speed of rotation of said first mentioned milling head, carriages slidable in a direction parallel to said axis of rotation of the work table, adapted to carry the said milling heads and to displace same with regard to one another.

4. A machine for cutting self-conjugated curved indentations by continuous rolling, comprising a work table, adapted to carry a blank and having an axis of rotation, a milling head, adapted to cut the convex faces of teeth, being operatively connected with said work table, having an axis of rotation and effecting a cutting motion consisting of a rotation about the said own axis and a feeding motion consisting of a translation in a direction at right angles to the said axes of rotation of its own and of the said work table, another milling head, adapted to cut the concave faces of teeth, having an axis of rotation and effecting a cutting motion consisting of a rotation about the said own axis and a feeding motion consisting of a translation in a direction at right angles to the said axes of rotation of its own and of said work table, a planetary gear, operatively connected to said milling heads and adapted to impress on said second mentioned milling head a feeding motion consisting of a driving motion of great speed and energy and a superimposed, variable, control motion of little speed and energy, a gearing with a fixed transmission ratio, operatively connecting the said milling heads and adapted to impress on said second mentioned milling head a cutting motion consisting of a rotation at a speed being in a given ratio to the speed of rotation of said first mentioned milling head, carriages slidable in a direction parallel to said axis of rotation of the work table, adapted to carry the said milling heads and to displace same with regard to one another.

5. A machine for cutting self-conjugated curved indentations by continuous rolling, comprising a work table, adapted to carry a blank and having an axis of rotation, a milling head, adapted to cut the concave faces of teeth, being operatively connected with said work table, having an axis of rotation and effecting a cutting motion consisting of a rotation about the said own axis and a feeding motion consisting of a translation in a direction at right angles to the said axes of rotation of its own and of said work table, another milling head, adapted to cut the convex faces of teeth, having an axis of rotation and effecting a cutting motion consisting of a rotation about the said own axis and a feeding motion consisting of a translation in a direction at right angles to the said axes of rotation of its own and of said work table, a planetary gear, operatively connected to said milling heads and adapted to impress on said second mentioned milling head a feeding motion consisting of a driving motion of great speed and energy and a superimposed, variable, control motion of little speed and energy, a gearing with a plurality of fixed transmission ratios, operatively connecting the said milling heads and adapted to impress on said second mentioned milling head a cutting motion consisting of a rotation at a speed being in a given ratio to the speed of rotation of said first mentioned milling head, carriages slidable in a direction parallel to said axis of rotation of the work table, adapted to carry the said milling heads and to displace same with regard to one another.

6. A machine for cutting self-conjugated curved indentations by continuous rolling, comprising a work table, adapted to carry a blank and having an axis of rotation, a milling head, adapted to cut the convex faces of teeth, being operatively connected with said work table, having an axis of rotation and effecting a cutting motion consisting of a rotation about the said own axis and a feeding motion consisting of a translation in a direction at right angles to the said axes of rotation of its own and of said work table, another milling head, adapted to cut the concave faces of teeth, having an axis of rotation and effecting a cutting motion consisting of a rotation about the said own axis and a feeding motion consisting of a translation in a direction at right angles to the said axes of rotation of its own and of the said work table, a planetary gear, operatively connected to said milling heads and adapted to impress on said second mentioned milling head a feeding motion consisting of a driving motion of great speed and energy and a superimposed, variable, control motion of little speed and energy, a gearing with a plurality of fixed transmission ratios, operatively connecting the said milling heads and adapted to impress on said second mentioned milling head a cutting motion consisting of a rotation at a speed being in a given ratio to the speed of rotation of said first mentioned milling head, carriages slidable in a direction parallel to said axis of rotation of the work table, adapted to carry the said milling heads and to displace same with regard to one another.

7. A machine for cutting selfconjugated curved indentations by continuous rolling, comprising a work table, adapted to carry a blank and having an axis of rotation, a milling head adapted to cut the concave faces of teeth, operatively connected with said work table, having an axis of rotation and effecting a cutting motion consisting of a rotation about the said own axis and a feeding motion consisting of a translation in a direction at right angles to the said axes of rotation of its own and of said work table, another milling head, adapted to cut the convex faces of teeth, having an axis of rotation and effecting a cutting motion consisting of a rotation about the said own axis and a feeding motion consisting of a translation in a direction at right angles to the said axes of rotation of its own and of said work table, a planetary gear operatively connected to said milling heads and adapted to impress on said second mentioned milling head a cutting motion consisting of a driving motion of great speed and energy and a superimposed, variable, control motion of little speed and energy, carriages, slidable in a direction parallel to the said axis of rotation of the work table, adapted to carry the said milling heads and to displace same with regard to one another.

8. A machine for cutting selfconjugated curved indentations by continuous rolling, comprising a work table, adapted to carry a blank and having an axis of rotation, a milling head, adapted to cut the convex faces of teeth, operatively connected with said work table, having an axis of rotation and effecting a cutting motion consisting of a rotation about the said own axis and a feeding motion consisting of a translation in a direction at right angles to the said axes of rotation of its own and of said work table, another milling head, adapted to cut the concave faces of teeth, having an axis of rotation and effecting a cutting motion consisting of a rotation about the said own axis and a feeding motion consisting of a translation in a direction at right angles to the said axes of rotation of its own and of said work table, a planetary gear operatively connected to said milling heads and adapted to impress on said second mentioned milling head a cutting motion consisting of a driving motion of great speed and energy and a superimposed, variable, control motion of little speed and energy, carriages, slidable in a direction parallel to the said axis of rotation of the work table, adapted to carry the said milling heads and to displace same with regard to one another.

9. A machine for cutting selfconjugated curved indentations by continuous rolling, comprising a work table, a milling head, adapted to cut a face of the teeth, means operatively connecting said milling head with said work table, another milling head, adapted to cut the opposite face of the teeth, a planetary gear operatively connected with said above mentioned means, other means operatively connecting said planetary gear with said second mentioned milling head, a change speed gear, operatively connected with said work table and adapted to impress a control motion on said planetary gear, a source of energy, adapted to drive said work table and said milling heads, being operatively connected with said first mentioned means.

10. A machine for cutting selfconjugated curved indentations by continuous rolling, comprising a work table, a milling head, adapted to cut a face of the teeth, means operatively connecting said milling head with said work table, another milling head, adapted to cut the opposite face of the teeth, a planetary gear, operatively connected with said abovementioned means, other means, operatively connecting said planetary gear with said second mentioned milling head, a change speed gear, operatively connected with said work table and adapted to impress a control motion on said planetary gear, a source of energy, adapted to drive said work table and said milling heads, being operatively connected with said second mentioned means.

11. A machine for cutting selfconjugated curved indentations by continuous rolling, comprising a work table, a milling head, adapted to cut a face of the teeth and operatively connected with said work table, another milling head, adapted to cut the opposite face of the teeth, a planetary gear comprising bevel wheels and operatively connecting said milling heads, and a change speed gear, operatively connected with said work table and adapted to impress a control motion on said planetary gear.

12. A machine for cutting selfconjugated curved indentations by continuous rolling, comprising a work table, a milling head, adapted to cut a face of the teeth and operatively connected with said work table, another milling head, adapted to cut the opposite face of the teeth, a planetary gear operatively connecting said milling heads, and a change speed gear, operatively connected with said work table and adapted to impress a control motion on said planetary gear.

13. A machine for cutting selfconjugated curved indentations by continuous rolling, comprising a work table, a milling head, adapted to cut a face of the teeth and operatively connected with said work table, another milling head, adapted to cut the opposite face of the teeth, a planetary gear operatively connecting said milling heads, a change speed gear, operatively connected with said work table, and a worm gear driven by said change speed gear and adapted to impress a control motion on said planetary gear.

14. A machine for cutting selfconjugated curved indentations by continuous rolling, comprising a work table, a milling head, adapted to cut a face of the teeth and operatively connected with said work table, another milling head, adapted to cut the opposite face of the teeth, a planetary gear, operatively connecting said milling heads, a pair of slides, adapted to carry said milling heads and to slide across the blank, a pair of feeding screws, operatively connected with said work table and adapted to drive said slides for impressing a feeding motion on said milling heads, and means, operatively connected with a said feeding screw and adapted to impress a control motion on said planetary gear.

15. A machine for cutting selfconjugated curved indentations by continuous rolling, comprising a work table adapted to carry a blank and having an axis of rotation, a pair of milling heads, having parallel axes of rotation and each adapted to cut a face of teeth on the said blank, slides movable in a direction at right angles to the axes of rotation of the said work table and carrying said milling heads, a planetary gear means operatively connecting said planetary gear and said milling heads, a source of energy operatively connected with said means, and means, operatively connected with said source of energy and adapted to impress a rotation on said work table and to impress a control motion on said planetary gear.

16. A machine for cutting selfconjugated curved indentations by continuous rolling, comprising a work table adapted to carry a blank and having an axis of rotation, a pair of milling heads, having parallel axes of rotation and each adapted to cut a face of teeth on the said blank, a carriage, adapted to carry a said milling head and to be displaced in a direction parallel to said axis of rotation of the said work table, movable in a direction at right angles to the axes of rotation of the said work table and carrying said milling heads, a planetary gear, means operatively connecting said planetary gear and said milling heads, a source of energy, operatively connected with said means, and means, operatively connected with said source of energy and adapted to impress a rotation on said work table and to impress a control motion on said planetary gear.

ALBERT FORSTER.